(12) United States Patent
Smith et al.

(10) Patent No.: US 10,895,088 B2
(45) Date of Patent: Jan. 19, 2021

(54) TAPERED SPIRAL WELDED STRUCTURE

(71) Applicant: Keystone Tower Systems, Inc., Denver, CO (US)

(72) Inventors: Eric D. Smith, Denver, CO (US); Alexander H. Slocum, Bow, NH (US)

(73) Assignee: Keystone Tower Systems, Inc., Denver, CO (US)

( * ) Notice: Subject to any disclaimer, the term of this patent is extended or adjusted under 35 U.S.C. 154(b) by 330 days.

(21) Appl. No.: 16/109,072

(22) Filed: Aug. 22, 2018

(65) Prior Publication Data

US 2019/0063101 A1 Feb. 28, 2019

Related U.S. Application Data

(60) Continuation of application No. 15/276,042, filed on Sep. 26, 2016, now Pat. No. 10,060,149, which is a
(Continued)

(51) Int. Cl.
| | | |
|---|---|---|
| *B21C 37/12* | (2006.01) | |
| *E04H 12/08* | (2006.01) | |
| *B21C 37/18* | (2006.01) | |
| *B23K 31/02* | (2006.01) | |
| *E04H 12/34* | (2006.01) | |

(52) U.S. Cl.
CPC ........... *E04H 12/08* (2013.01); *B21C 37/124* (2013.01); *B21C 37/185* (2013.01); *B23K 31/02* (2013.01); *E04H 12/342* (2013.01); *Y02E 10/728* (2013.01); *Y10T 29/49318* (2015.01); *Y10T 29/49826* (2015.01); *Y10T 428/12* (2015.01)

(58) Field of Classification Search
CPC ............................. B21C 37/12; B21C 37/124
See application file for complete search history.

(56) References Cited

U.S. PATENT DOCUMENTS

| 1,498,176 A | 6/1924 | Lachman |
| 1,659,792 A | 2/1928 | Thorsby et al. |
| | (Continued) | |

FOREIGN PATENT DOCUMENTS

| CN | 85105639 | 1/1987 |
| CN | 1091062 | 8/1994 |
| | (Continued) | |

OTHER PUBLICATIONS

CNIPA, "CN Application No. 201580028200.0 Third Office Action dated Sep. 19, 2019", English and Chinese translations, 21 pages.
(Continued)

*Primary Examiner* — Adam Krupicka
(74) *Attorney, Agent, or Firm* — The Marbury Law Group, PLLC

(57) ABSTRACT

A method for creating a tapered spiral welded conical structure where the overall shape of the cone is first graphically slit axially and unwrapped, and then a series of construction arcs and lines are created to form the edge lines of a strip that can then be wrapped (rolled) to form a tapered conical structure. The edges of the spirally wound strip can be welded together, and a very large conical structure can thus be achieved. Various construction options are presented from a constant width strip to strip made from straight segments. Equations are given for the formation of the strips to enable those skilled in the art of spiral welded tubing to practice the invention.

17 Claims, 7 Drawing Sheets

Related U.S. Application Data division of application No. 14/247,856, filed on Apr. 8, 2014, now Pat. No. 9,475,153, which is a continuation of application No. 12/693,369, filed on Jan. 25, 2010, now Pat. No. 8,720,153.

(56) References Cited

U.S. PATENT DOCUMENTS

| | | |
|---|---|---|
| 2,054,153 A | 9/1936 | Awbrey |
| 2,355,707 A | 8/1944 | De Boer et al. |
| 2,412,678 A | 12/1946 | Goldman |
| 2,567,020 A | 9/1951 | Kueter |
| 2,584,074 A | 1/1952 | Wilkins et al. |
| 2,593,714 A | 4/1952 | Robinson et al. |
| 2,706,851 A | 4/1955 | Stout et al. |
| 2,991,740 A | 7/1961 | Eckhardt |
| 3,227,345 A | 1/1966 | Vilem |
| 3,300,042 A | 1/1967 | Gordon |
| 3,332,265 A | 7/1967 | Colas |
| 3,407,639 A | 10/1968 | Kehne |
| 3,472,053 A | 10/1969 | Chang |
| 3,606,783 A | 9/1971 | Lewis |
| 3,650,015 A | 3/1972 | Davis |
| 3,775,835 A | 12/1973 | Cauffiel et al. |
| 3,776,010 A | 12/1973 | Krakow |
| 3,808,862 A | 5/1974 | Tanaka et al. |
| 3,888,283 A | 6/1975 | Cauffiel |
| 3,991,597 A | 11/1976 | Krakow et al. |
| 4,082,211 A | 4/1978 | Embury |
| 4,147,454 A | 4/1979 | Willums et al. |
| 4,261,931 A | 4/1981 | Rothrock et al. |
| 4,367,640 A | 1/1983 | Heitzman et al. |
| 4,438,643 A | 3/1984 | Menzel et al. |
| 4,640,453 A | 2/1987 | Oe et al. |
| 4,927,050 A | 5/1990 | Palazzo et al. |
| 4,945,363 A | 7/1990 | Hoffman |
| 5,063,969 A | 11/1991 | Snyder et al. |
| 5,139,603 A | 8/1992 | Kunz et al. |
| 5,301,869 A | 4/1994 | Toyooka et al. |
| 5,326,410 A | 7/1994 | Boyles |
| 5,573,716 A | 11/1996 | Jacobson |
| 5,862,694 A | 1/1999 | Horning |
| 5,865,053 A | 2/1999 | Abbey, III et al. |
| 5,868,888 A | 2/1999 | Don et al. |
| 6,306,235 B1 | 10/2001 | Henderson |
| 6,339,945 B2 | 1/2002 | Miller et al. |
| 6,533,749 B1 | 3/2003 | Mitusina et al. |
| 6,732,906 B2 | 5/2004 | Andersen |
| 6,964,141 B2 | 11/2005 | Igarashi |
| 7,739,843 B2 | 6/2010 | Cortina-Cordero |
| 7,802,412 B2 | 9/2010 | Jensen |
| 8,146,320 B2 | 4/2012 | Seidel et al. |
| 8,196,358 B2 | 6/2012 | Shiraishi |
| 8,590,276 B2 | 11/2013 | Kryger et al. |
| 8,636,196 B2 | 1/2014 | Hill et al. |
| 9,168,576 B2 | 10/2015 | Unan |
| 2001/0018839 A1 | 9/2001 | Miller et al. |
| 2007/0245789 A1 | 10/2007 | Zepp et al. |
| 2007/0294955 A1 | 12/2007 | Sportel |
| 2009/0021019 A1 | 1/2009 | Thomsen |
| 2009/0165518 A1 | 7/2009 | Booth |
| 2009/0188207 A1 | 7/2009 | Gordin et al. |
| 2009/0320542 A1 | 12/2009 | Kephart et al. |
| 2010/0095508 A1 | 4/2010 | Wahlen et al. |
| 2011/0179623 A1 | 7/2011 | Smith et al. |
| 2012/0029294 A1 | 2/2012 | Smith |
| 2012/0273556 A1 | 11/2012 | Unan et al. |
| 2013/0074564 A1 | 3/2013 | Smith et al. |
| 2014/0220371 A1 | 8/2014 | Smith et al. |
| 2015/0273550 A1 | 10/2015 | Takata |
| 2016/0107213 A1 | 4/2016 | Smith et al. |
| 2018/0133769 A1 | 5/2018 | Smith et al. |
| 2019/0119344 A1 | 4/2019 | Takata et al. |

FOREIGN PATENT DOCUMENTS

| | | |
|---|---|---|
| CN | 2848445 | 12/2006 |
| CN | 201613273 | 10/2010 |
| CN | 203343212 | 12/2013 |
| DE | 1075530 | 2/1960 |
| EP | 0013870 | 8/1980 |
| GB | 1041159 | 9/1966 |
| GB | 1075548 | 7/1967 |
| JP | 427145 | 3/1967 |
| JP | 4431455 | 12/1969 |
| JP | S5870918 | 4/1983 |
| JP | S5956934 | 4/1984 |
| JP | 1278911 | 11/1989 |
| WO | WO2013043920 | 3/2013 |
| WO | WO-2015148756 | 10/2015 |

OTHER PUBLICATIONS

CNIPA, "CN Application No. 201811092830.6 Office Action dated Oct. 28, 2019", English and Chinese translations, 15 pages.

EPO, "EP Application Serial No. 15767860.8 Examination Report dated Nov. 22, 2019", 3 pages.

USPTO, "U.S. Appl. No. 16/208,831 Non-Final Office Action dated Oct. 3, 2019", 12 pages.

EPO, "EP Application Serial No. 19190631.2 Search Report dated Sep. 6, 2019 dated", 5 pages.

CNIPA, "CN Application No. 201280056927.6 Notification of ReExamination dated May 20, 2019", English and Chinese Translations, 14 pages.

CNIPA, "CN Application No. 201580028200.0 Second Office Action dated Apr. 15, 2019", English and Chinese Translations, 28 pages.

CIPO, "CA Application No. 2,849,300 Examiners Report dated Mar. 18, 2019", 4 pages.

IPO, "IN Application No. 2359/CHENP/2014 First Examination Report dated Feb. 25, 2019", 7 pages.

"How to lay out sprial-formed Welded tapered cylinders" by A.A. Pfeifer; Product Engineering; Apr. 15, 1963, Apr. 15, 1963, pp. 88-90.

USPTO, "U.S. Appl. No. 13/623,817 Final Office Action dated Dec. 10, 2014", 11 pages.

USPTO, "U.S. Appl. No. 13/623,817 Non-Final Office Action dated Apr. 8, 2015", 12 pages.

USPTO, "U.S. Appl. No. 13/623,817 Non-Final Office Action dated Jul. 18, 2014", 15 pages.

USPTO, "U.S. Appl. No. 13/623,817 Notice of Allowance dated Sep. 25, 2015", 9 pages.

USPTO, "U.S. Appl. No. 14/228,481 Notice of Allowance dated Feb. 1, 2018", 15 pages.

USPTO, "U.S. Appl. No. 14/228,481 Notice of Allowance dated Oct. 12, 2018", 9 pages.

USPTO, "U.S. Appl. No. 14/247,856 Notice of Allowance dated Jun. 27, 2016", 9.

USPTO, "U.S. Appl. No. 14/978,175 Non-Final Office Action dated Mar. 9, 2018", 15 pages.

USPTO, "U.S. Appl. No. 14/978,175 Notice of Allowance dated Oct. 22, 2018", 5 pages.

USPTO, "U.S. Appl. No. 14/978,175 Notice of Allowance dated Nov. 8, 2017", 10 pages.

USPTO, "U.S. Appl. No. 15/276,042 Non-Final Office Action dated Sep. 25, 2017", 9 pages.

USPTO, "U.S. Appl. No. 15/276,042 Notice of Allowance dated Apr. 27, 2018", 5 pages.

USPTO, "U.S. Appl. No. 12/693,369 Final Office Action dated Aug. 2, 2013", 10 pages.

USPTO, "U.S. Appl. No. 12/693,369 Non-Final Office Action dated Jul. 13, 2012", 10 pages.

USPTO, "U.S. Appl. No. 12/693,369 Notice of Allowance dated Dec. 26, 2013", 8 pages.

USPTO, "U.S. Appl. No. 12/693,369, Non-Final Office Action dated Nov. 7, 2012", 7 pages.

USPTO, "U.S. Appl. No. 14/228,481, Final Office Action dated Nov. 3, 2016", 14 pages.

(56) References Cited

OTHER PUBLICATIONS

USPTO, "U.S. Appl. No. 14/228,481, Non-Final Office Action dated May 18, 2016", 16 pages.
USPTO, "U.S. Appl. No. 14/247,856 Non-Final Office Action dated Mar. 28, 2016", 10 pages.
USPTO, "U.S. Appl. No. 4/228,481, Non-Final Office Action dated Aug. 31, 2017", 15 pages.
USPTO, "U.S. Appl. No. 14/978,175, Non-Final Office Action dated Jan. 27, 2017", 15 pages.
USPTO, "U.S. Appl. No. 14/978,175, Notice of Allowance dated May 17, 2017", 5 pages.
Auspat, "AU Application No. 2012312351 First Office Action dated Aug. 8, 2016", 2 pages.
IP AUS, "AU Application No. 2017200527 Examination Report dated Feb. 5, 2018", 3 pages.
IP Australia, "AU Application Serial No. 2015236028, Examination Report dated Aug. 10, 2018", 3 pages.
CIPO, "CA Application No. 2,849,300 Examination Report dated May 11, 2018", 3 pages.
China Patent Office, "CN Application No. 201280056927.6 Decision on Rejection dated Jun. 4, 2018", English and Chinese , 19 pages.
CIPO, "CN Application No. 201280056927.6 Office Action dated May 18, 2017", English and Chinese Translations , 15 pages.
CIPO, "CN Application No. 201280056927.6 Office Action dated Nov. 6, 2017", English and Chinese translations , 16 Pages.
CIPO, "CN Application No. 201280056927.6 Office Action dated Dec. 3, 2015", English and Chinese translations , 21 pages.
CIPO, "CN Application No. 201580028200.0 First Office Action dated Jul. 24, 2018", English and Chinese Translations , 25 pages.
EPO, "EP Application No. 12833030.5 Examination Report dated Oct. 30, 2017", 7 pages.
EPO, "EP Application Serial No. 12833030.5, EP Supplemental Search Report dated Feb. 12, 2016", 7 pages.
EPO, "EP Application Serial No. 15767860.8 Supplemental Search Report dated Nov. 7, 2017", 8 pages.
International Searchingauthority, "International Application Serial No. PCT/US12056414, Preliminary Report on Patenability dated Apr. 3, 2014", 6 pages.
ISA, "International Application Serial No. PCT/US15/22648, Search Report and Written Opinion dated Aug. 12, 2015", 12 pages.
JPO, "JP Application No. 2014-531976 Office Action dated Aug. 16, 2016", Japanese Translations and English Translations , 6 pages.
JPO, "JP Application No. 2016-242956 First Office Action dated Jan. 23, 2018", English and Japanese translation , 5 pages.
KIPO, "KR Application Serial No. 10-2014-7008301 Office Action dated Aug. 24, 2018", English and Korean translations. , 11 pages.
IMPI, "MX Application No. MX/a/2014/003314 Notice of Allowance dated Jul. 25, 2016", 1 page.
International Searchingauthority, "PCT Application No. PCT/US12/56414 International Search Report and Written Opinion dated Dec. 14, 2012", 7 pages.
WIPO, "PCT Application No. PCT/US15/22648 International Preliminary Report on Patentability dated Oct. 13, 2016", 9 pages.
IP Australia, "AU Application Serial No. 2018203517 Examination Report dated Jun. 18, 2019", 2 pages.
KIPO, "KR Application Serial No. 10-2019-7008024 Office Action dated May 20, 2019", English and Korean translations , 5 pages.
USPTO, "U.S. Appl. No. 15/851,472 Non-Final Office Action dated Jun. 17, 2020", 7 pages.
USPTO, "U.S. Appl. No. 16/208,831 Final Office Action dated Apr. 9, 2020", 11 pages.
IP Australia, "AU Application Serial No. 2019202930 Examination Report dated Apr. 29, 2020", 3 pages.
CNIPA, "CN Appln Serial No. 201811092830.6 Office Action dated Apr. 2, 2020", English and Chinese Translations , 16 pages.
IMPI, "MX Appln Serial No. MX/a/2016/012710 Office Action dated Mar. 17, 2020", English and Mexican Translations , 7 pages.

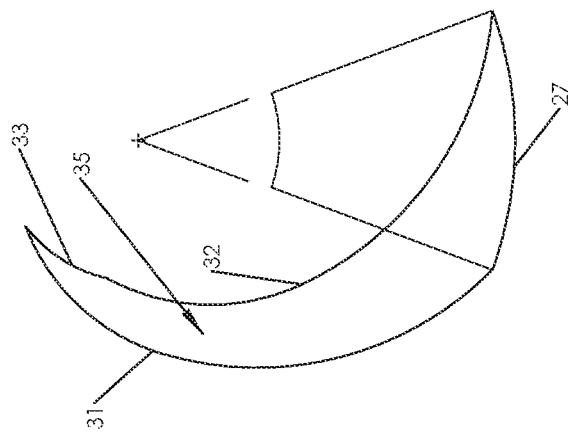
Fig. 3d
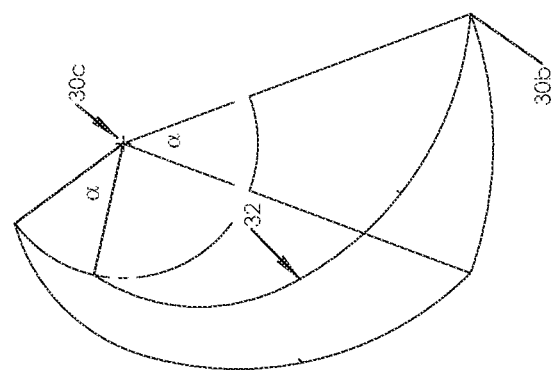
Fig. 3c
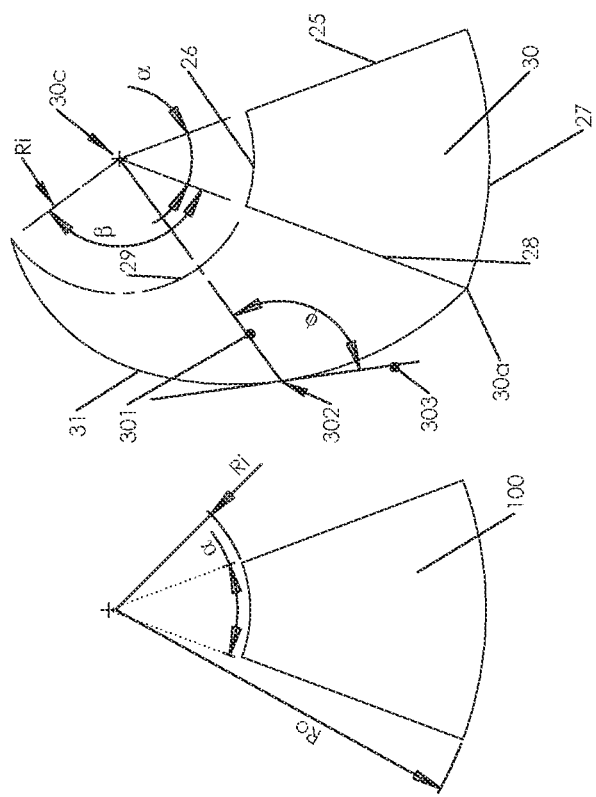
Fig. 3b
Fig. 3a

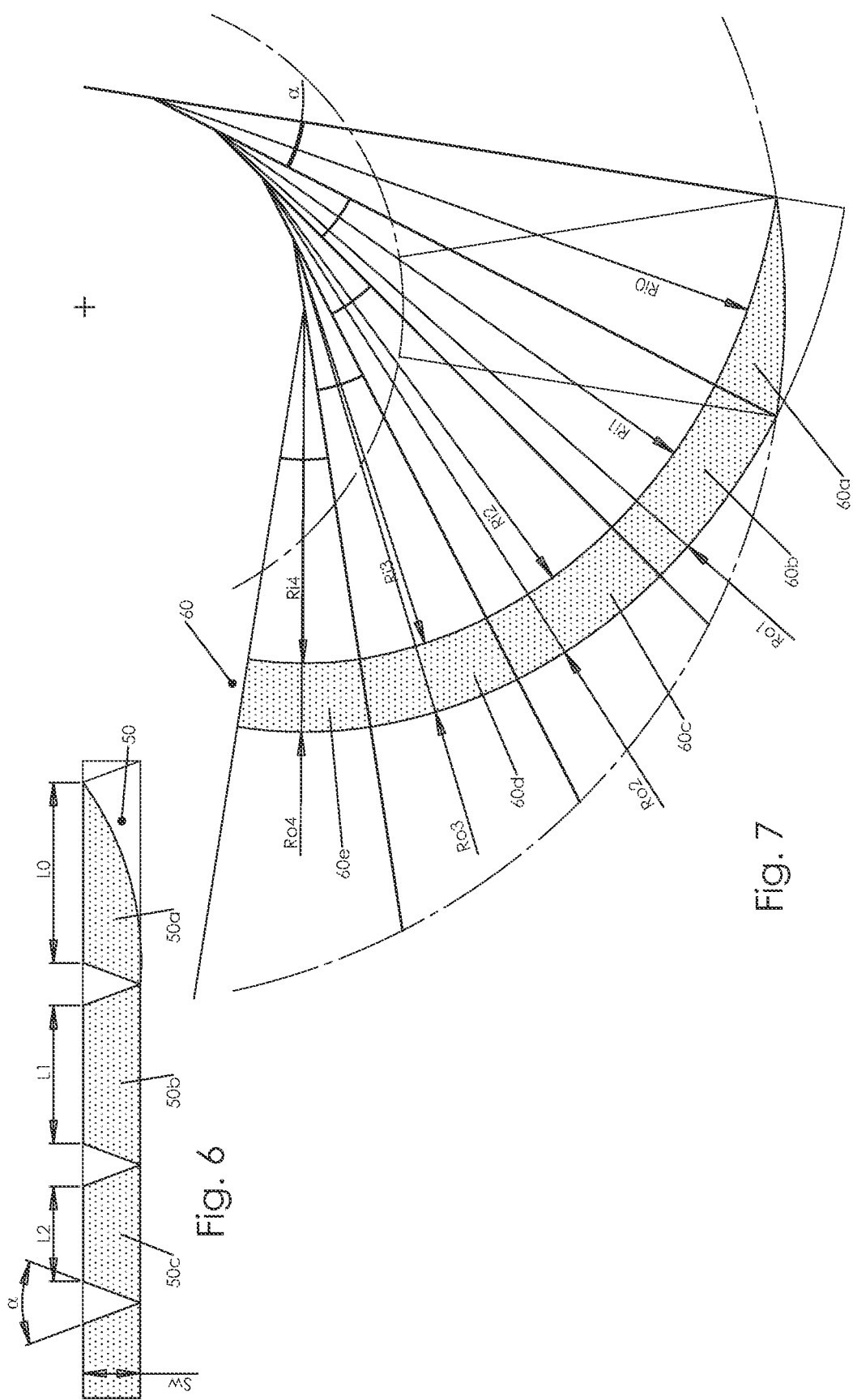

TAPERED SPIRAL WELDED STRUCTURE

CROSS-REFERENCE TO RELATED APPLICATIONS

This application is a continuation of U.S. patent application Ser. No. 15/276,042, filed Sep. 26, 2016, now U.S. Pat. No. 10,060,149, which is a divisional of U.S. patent application Ser. No. 14/247,856, filed Apr. 8, 2014, now U.S. Pat. No. 9,475,153, which is a continuation of U.S. patent application Ser. No. 12/693,369, filed Jan. 25, 2010, now U.S. Pat. No. 8,720,153, with the entirety of each of these applications hereby incorporated herein by reference.

This invention relates to a method for creating tapered spiral welded structures from strips of material that either have been precut or formed and then are rolled and welded to form a tapered spiral welded structure, or a straight strip of material is notched and welded transversely in addition to being spirally welded. Such tapered towers can be manufactured on-site to enable very large diameter structural towers, not capable of being trucked to site.

STATEMENT FEDERALLY FUNDED RESEARCH

No federal funds were used in the development of this invention.

FIELD OF THE INVENTION

The present application relates to a method for defining the shape of a strip of metal that can then be formed into a spirally welded tapered conical structure.

BACKGROUND OF THE INVENTION

A spiral welded conical structure that could be made on the construction site could be far more efficient than current designs of support structures such as wind turbine towers. It could result in lighter weight for the same or greater height, compared to traditional towers that are transported to site and bolted together. Existing spiral welding technology is incapable of producing the required conical structure without significant deformation of the metal stock, a process that is impractical to achieve on site.

U.S. Pat. No. 2,038,576 describes forming a cone from a piece of paper cut into an arc segment; however, the method does not allow for multiple wraps as would be required to form a large diameter cone from a single narrow strip of material; nor does the method have any logical extension to evolve into such a required shape as the radial edges of the paper force an axial seam and thus are inherently limiting on the length of the cone that can be formed to be less than the radial length of the edges.

U.S. Pat. No. 2,008,423 describes making a hollow tapered shaft, such as for a golf club, from a uniform or tapered width strip of material. The inventor properly notes that as the strip is wound to form the tapered cone, the helix angle changes which causes the edges to spread apart, and that this is prevented by winding the strip onto a mandrel while under tension which allows the strip to be deformed so the pitch can change without causing buckling of the strip. While suitable for forming a shaft such as golf club, it would not be possible to provide a mandrel for a very large structure, such as a wind turbine tower.

U.S. Pat. No. 3,997,097 describes forming a tapered tube by first feeding a strip between forming rollers that taper the material across its width as a slight curvature is imparted to the strip to enable the helix angle to change as the tapered tube is formed. This patent describes "known prior art" but not U.S. Pat. No. 2,008,423, which describes the critical function of tensioning a constant width strip while forming it over a mandrel although the deformation described is similar. While a mandrel is not required for this case, the order of size of the machine required to form the strip in this manner would make it difficult to realize for very large cones such as that required for large structures such as a windmill tower. Feeding a previously manufactured bent strip to the machine is mentioned, but no algorithm for what the shape needs to be is mentioned.

U.S. Pat. No. 4,082,211 (by the same inventor as U.S. Pat. No. 3,997,097 and using similar figures) describes a process for producing frusto-conical tubes of gradually varying diameter by winding strip stock into a chain of frusto-conical helical turns and joining the edges as they are wound by automatically continuously sensing the variation in tube diameter as it is being produced, automatically governing said variation responsive to rotation of a, pair of stock-edge squeezing rollers, and automatically feeding back sensed information of said variation in tube diameter to effect the desired adjustment in spacing between said rollers, and for automatically controlling the rate at which said variation takes place. This will create the in-plane curvature required, but it is not applicable to the large 2 m wide strips needed for large structures, as the rolling forces in the cold state would be titanic and it would not be practical to heat the strip. Furthermore, the described feedback system is only capable of finding the required curvature of the strip during the cone forming process.

U.S. Pat. No. 6,339,945 describes a spiral tube forming system for forming a strip into a spiral tube; a strip in-feed system adapted for feeding a strip to the pipe forming system; and computer-controlled means for continuously varying the angular orientation of the tube forming system relative to the strip in-feed system to selectively vary the diameter of the forming tube. It uses a metal strip of constant width and continuous change in feeding angle to vary diameter. There is no mention of the required geometry to form a cone. There is no mention of cutting the metal strip. The apparatus disclosed does not have the ability to bend the strip in-plane, and even it was to do so, the strip would buckle. To form the strip in-plane curvature, the strip must be very hot, and hence is best form at the mill when it is made. If the strip were provided from the mill with the desired curvature, feeding angle control is necessary as described in U.S. Pat. Nos. 6,732,906, 3,997,097, and 1,914,976.

U.S. Pat. No. 6,732,906 describes a method for meeting the varying helix angle requirement by imparting out-of-plane waviness to one edge of an otherwise constant width strip to impart an overall slight in-plane curvature needed to form the varying helix angle as 4 tapered cone is formed. However, this could decrease the buckling strength of the tower. Although it uses a metal strip of constant width which is bent in plane using corrugating rolls there is no mention of the required geometry to form a cone, which as shown by the present invention, is a complex non-obvious shape. There is no mention of cutting the metal strip.

For large wind turbine towers, for example, it will be desirable to form tapered (conical) towers on-site so the base can be very large in diameter. Prior art to this effect includes U.S. Pat. No. 3,030,488 where a metal strip spool rests on its own weight on its driving assembly. The method describes sensing the strip edge position before the weld and creating a feedback loop including means to vary the feed-in angle. A stated goal of this method is to decrease the number of elements and thus provide a "transportable machine by which tubes can be welded at the point of use" [1-29].

The need for taller towers with larger diameter bases is discussed below in the context of FIGS. 9 and 10. One way that industry has currently been trying to meet this need is through segmented designs. Currently, cylindrical segments are used, but to get to large diameters, the circular segments can be further segmented into arcs. As an example, see US patent application "Method of constructing large towers for wind turbines (2003, application Ser. No. 10/549,807): "In order to transport large size windmill towers, the invention suggests a steel tower (1) for a windmill, comprising a number of cylindrical or tapered tower sections (2), at least the wider sections (2) of which being subdivided into two or more elongated shell segments (3), which combine into a complete tower section (2) by means of vertical flanges (6) tightened together, e.g., by bolts (10), said shells being also provided with upper and lower horizontal flanges (4), respectively; to allow interconnection of tower sections (2) one on top of the other." [Abstract]. However, this results in great complexity and an enormous number of bolts to be installed and then periodically checked.

OBJECTS OF THE INVENTION

An object of this invention, therefore, is to provide a geometric construction method for forming a strip of material such that it can then be wrapped onto the surface of an imaginary tapered conical form and be spirally welded to form a tapered conical structure.

A further object of the invention is to provide analytical expressions for forming a strip such that it can be wrapped to form a spiral welded tapered conical structure.

A further object of the invention is to provide analytical expressions for forming a strip such that it can be wrapped with as many revolutions as desired to form a spiral welded tapered conical structure, such as would be required to make a large diameter conical structure from a relatively narrow strip of material.

A further object of the invention is to provide analytical expressions for forming a strip such that it can be wrapped to form a conical structure that can be edge-butt welded along the length of the spiral.

And yet another object of the invention is to allow a continuous strip as defined above to be made and then rolled up into a coil and then unwound from the coil and then formed into the desired long tapered cone.

Other and further objects will be explained hereinafter and more particularly delineated in the appended claims.

SUMMARY

A method is presented for forming a tapered spiral welded conical structure where the overall shape of the cone is first graphically slit axially and unwrapped, and then a series of construction arcs and lines are created to form the edge lines of a strip that can then be wrapped (rolled) to form a tapered conical structure. The edges can be spiral welded together, and a very large structure can be achieved. Various construction options are presented from a constant width strip to strip made from straight segments. As and example, a constant width strip used to form a typical tower (2 m wide strip, 5.5 m to 2.5 m diameter cone, 100 m high) would have an in-plane radius of curvature that varies from around 180 m down to 80 m. Equations are given for the formation of the strips to enable those skilled in the art of spiral welded tubing to practice the invention.

DRAWINGS

The present invention can best be understood in conjunction with the accompanying drawing, in which:

FIGS. 3a-3d show the steps required to create a strip of material that can wrap in a spiral to form a cone with 3 wraps with the edges of the strip abutting each other so they can be welded together;

FIG. 6 shows a constant width straight-sides strip (as depicted in FIG. 4a) being constructed where the segments are straight segments with triangular regions cut from between them;

FIG. 7 shows a constant width arc-shape sides strip being constructed where no segments need to be cut from between regions, but the radii of curvature varies;

PREFERRED EMBODIMENT(S) OF THE INVENTION

Figure 1:
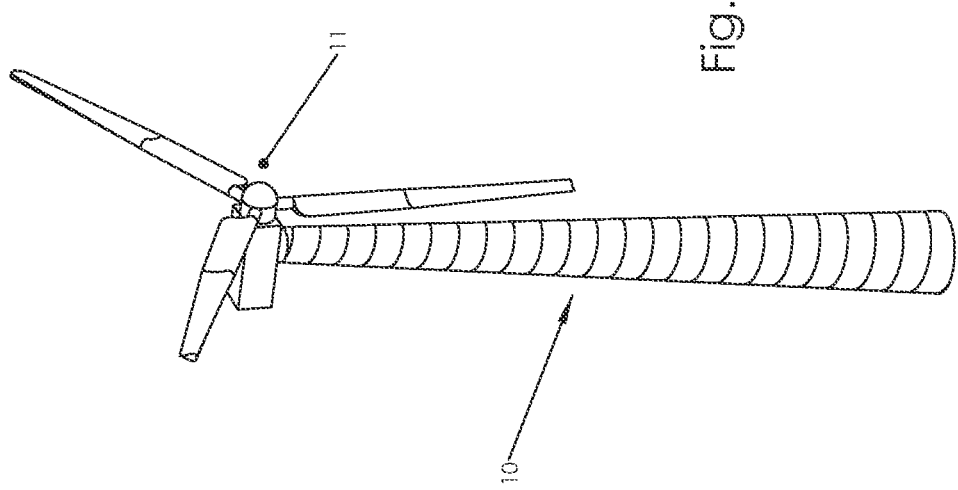
FIG. 1 shows a wind turbine atop of a tapered spiral welded cone.

FIG. 1 shows a wind turbine 11 atop a tapered tower 10. Such towers are typically manufactured in segments from axially welded steel plate that are transported to site and assembled. This necessitates large bolted flange connections every 20 meters or so and the largest diameter that can be transported is typically 4-4.3 meters. By forming the sections on-site, diameters of 5 meters or more could be formed. Since the bending strength goes with the cube of the diameter, even a 10% increase in diameter represents a 33% increase in strength for only a 10% increase in weight if the same wall thickness structure is used. Going from a 4 meter diameter structure to a 5 meter diameter structure increases the strength by almost 100%. Hence there is a clear need to be able to make large conical towers on site so they can be used to support machines such as wind turbines shown in FIG. 1.

As discussed above, however, there has not been a simple and effective way to accomplish manufacturing of a tapered tower (conical structure) that does not require in-plane deformation of the material by the machine. Machines that could form the large wide strips that would be needed to form a large tower on site would not be practical, unless perhaps installed at a steel mill to operate as the hot wide strip is made, or even economically transportable to a site for creating large towers with base diameters on the order of 5 meters.

Figure 2B:
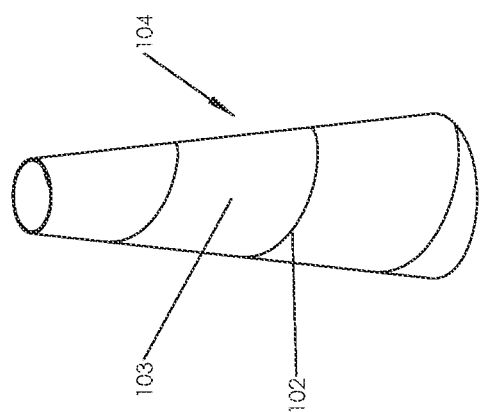
FIG. 2b shows a cone with multiple wraps of a sheet to make the cone.
Figure 2A:
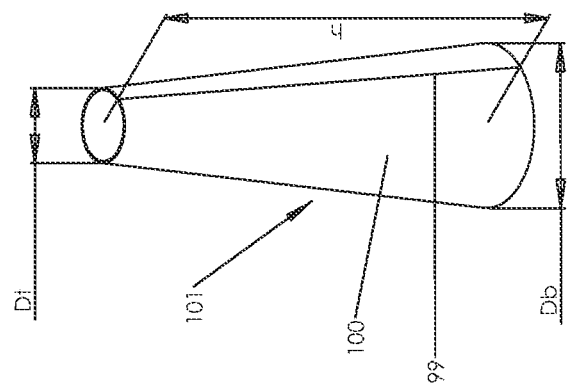
FIG. 2a shows a cone with one wrap of a sheet to make the cone.

In the simplest form, FIG. 2a shows a cone 101 of height h, top diameter Dt and base diameter Db. This conical structure is formed by a single arc segment sheet 100 with a longitudinal joint 99. However, to form the conical section, the sheet must be rolled along its entire length which is not practical for a very large cone. Hence as shown in FIG. 2B a spiral wrap section 103 with spiral joint 102 is preferred to form an equivalent cone 104. The challenge is that the helix angle changes with height if a constant width strip is used, and this then necessitates changing radii of curvature of the strip. The present invention provides a generalized method for determining the geometry of any and all strips that can be wrapped onto the surface of the desired cone without requiring in-plane deformation during the wrapping process.

FIGS. 3a-3d show how the present invention provides a robust method for defining the geometry of a flat strip 35 equivalent to annulus segment 100 that can be rolled to form a conical structure 101. Starting with the desired cone geometry 101, split and unwrap the cone to form a flat wedge-shaped segment 100 of an annulus with a large outside diameter edge (radius $R_o$) and a smaller inside diameter edge (radius $R_i$), where the larger diameter edge arc length equals the circumference of the cone base and the smaller diameter edge arc length equals the circumference of the cone top, and straight sides connecting the edges with an angle $\alpha$ between them; hence the parameters $R_o$, $R_i$, and $\alpha$ are defined as:

$$R_o = \frac{D_b\sqrt{4h^2 + (D_b - D_t)^2}}{2(D_b - D_t)}$$

$$R_t = \frac{D_t\sqrt{4h^2 + (D_b - D_t)^2}}{2(D_b - D_t)}$$

$$\alpha = \frac{\pi D_b}{R_o}$$

Where $D_t$ is the top diameter of the desired cone, $D_b$ is the base diameter, and h is the height of the desired cone.

Draw a construction curve 31, which can be continuous or segmented as may be desired, from a vertex 30a on the edge 28 on the outside arc 27 of radius $R_o$ inward to intersect a construction circle 29 whose radius is equal to and concentric with the inside arc 26 of radius $R^i$. The angle $\beta$ between the radial rays passing from the center of the annulus 30c through the start and stop points of the construction curve 31 is equal to the product of the number of desired wraps on the cone and the angle $\alpha$ between the straight sides 28 and 25 of the annulus segment. In FIG. 3b, the angle $\beta$ is shown to be $3\alpha$, and hence the segment 35 in FIG. 3d would make 3 wraps to form a cone. Partial wraps are acceptable.

FIG. 3c shows the next step in the method: copy the construction curve 31 and rotate the copy about the center 30c of the annulus segment by an angle $\alpha$ equal to the angle $\alpha$ between the straight sides 28 and 25 of the flat wedge-shaped segment; and connect the vertices of the original construction curve 31 and the copied curve 32 with arc segments 33 and 27 concentric and with equal radius to the inner and outer annuli radii respectively to form a closed section 35 which can then be wrapped to form the original cone formed by the unwrapped single segment 100.

Figure 9:
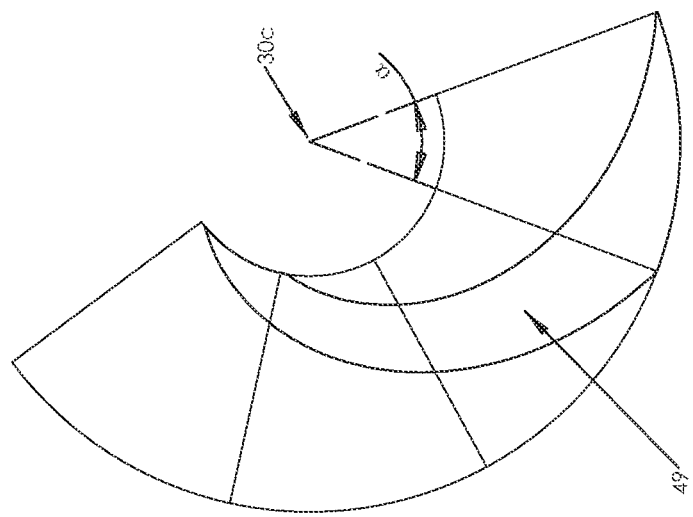
FIG. 9 shows a logarithmic spiral shape strip that can be formed to wrap into a conical structure.

When forming a cone, the strip must be fed into the coiling system at the correct in-feed angle $\phi$, also known as the helix angle. For all strips other than those formed by a logarithmic spiral, shown in FIG. 9, the in-feed angle must vary as the cone is formed. The required in-feed angle can be found on the construction by drawing a radial line 301 from the point 30c at the center of the annulus to a point 302 on the construction curve. The angle $\phi$ between the line 303 tangent to the construction curve at this point 302 and radial line 301 is the helix angle of the cone when this section of the strip enters the cone.

Every strip that can be formed into a cone without overlap or in-plane deformation can be found using this construction technique. The geometric properties of the strip are defined by the choice in construction curve 31. There are a number of special cases that may make construction of a strip coiling machine easier.

Figure 4C:
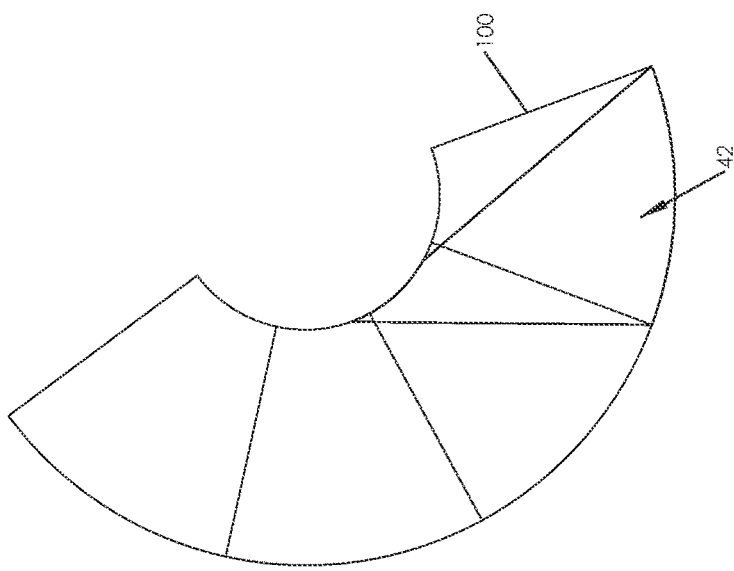
FIGS. 4a-4c show different types of strip shapes that can be formed using the generalized method of this invention.
Figure 4B:
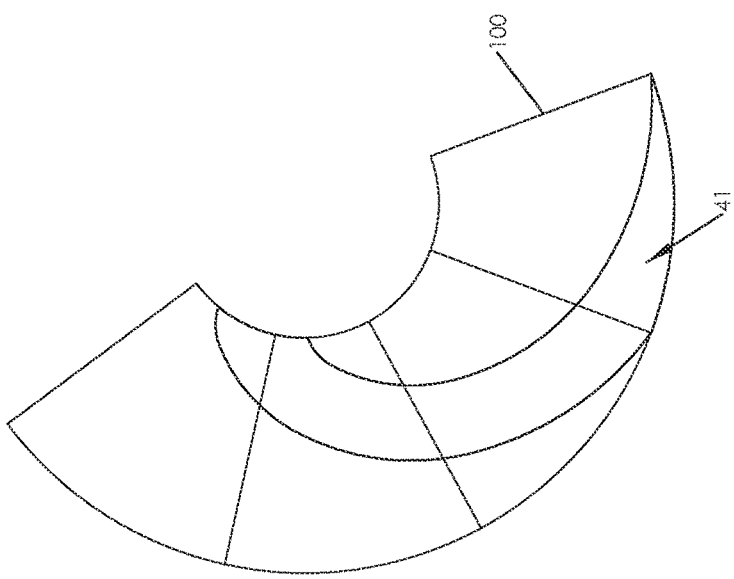

For example, for most strips the strip in-feed angle must vary during coiling to form the cone. The exception to this is the strip formed from a logarithmic spiral 48 shown in FIG. 9. In polar coordinates this curve is defined as:

$$r(\theta) = e^{\theta \cot(\phi)}$$

$$r = \frac{D_t \pi}{\alpha} \to \frac{D_b \pi}{\alpha}$$

Where $r(\theta)$ is the distance from the center of the annulus 30c to points on the logarithmic spiral construction curve, and $\theta$ is the polar angle in radians to these same points measured from an arbitrary zero reference angle. The start and stop points of this curve are defined by the dimensions of the desired cone as defined by $D_t$, $D_b$ and $\alpha$. This curve, and a copy of it rotated about the origin by $\alpha$, form the edges of a curved strip that can be fed into a cone at a constant helix angle $\phi$. The strip will not have a constant width as shown in FIG. 4b.

Flaying a non-constant width strip may make material handling more difficult for the cone forming machine, and may result in more wastage of raw materials. There are a number of solutions that result in a constant width strip.

One constant width strip solution can be formed from a series of annular segments as shown in FIG. 7. Each of these annulus segments has an included angle $\alpha$ equal to the included angle of the original construction annulus segment 30. The difference between the inner radius $r^{i,n}$ and outer radius $r_{o,n}$ is held fixed allowing these annulus segments to be joined into a long strip with constant width $S_w$. The inner and outer radii of the $n^{th}$ segment can be calculated based on the cone dimensions $D_t$, $D_b$ and $\alpha$ the desired strip width $S_w$:

$$r_{i,n} = \sqrt{\left(\frac{\pi D_b}{\alpha}\right)^2 - \left(\frac{S_w}{2\tan(\alpha/2)}\right)^2} - S_w(1/2 + n)$$

$$r_{o,n} = r_{i,n} + S_w$$

The initial partial annulus segment 60a is found by setting n to zero, and using this equation to determine the size and shape of the annulus segment. The section of the strip outside of the outside radius construction arc 27 must be removed so that the cone will have a flat base. The next annulus segment 60b is then found by setting n to one and appending this segment to the initial segment. Further segments 60*c*, 60*d*, 60*e* . . . are found by incrementing n by one, until the top of the cone is reached. This results in a constant width strip that can be coiled into the desired cone. The strip will have continuous and smooth edges, but will have step changes in the radius of curvature.

Figure 4A:
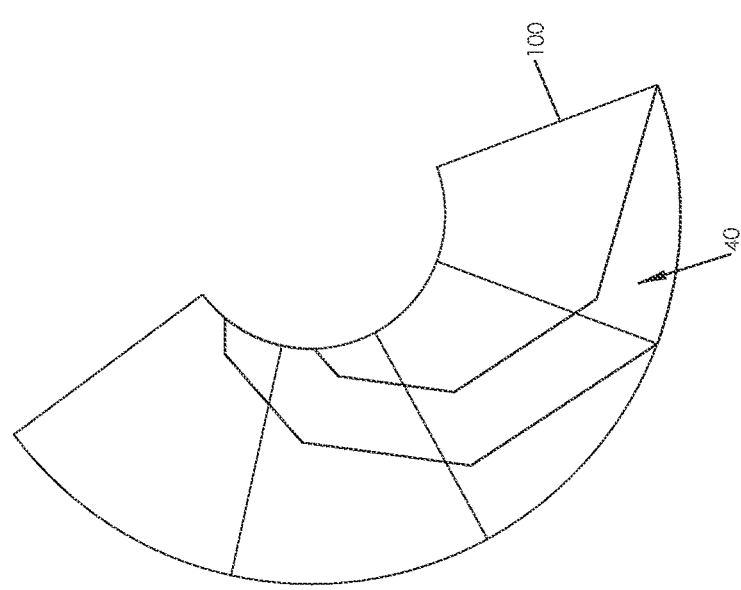

Curved strip metal stock is generally not readily available so solutions that make use of straight strips may be preferred. One solution is a stepped spiral as shown in FIG. 4*a*. One way to form this shape from a straight strip is to periodically removing triangular sections of material, and rejoin the edges to form the stepped spiral. FIG. 6 shows this strip before the segments are rejoined.

In this solution, the triangles removed are all identical isosceles triangles with a height equal to $S_w$, and with the angle between the equal sides equal to $\alpha$, the same angle as the included angle in the original construction annulus segment 30. The distance between the $n^{th}$ and $n^{th}+1$ cutout is given by:

$$L_n = \sqrt{\left(\pi D_b \frac{\sin(\alpha/2)}{\alpha/2}\right)^2 - S_w^2} - S_w(1+2n)\tan(\alpha/2)$$

Using this geometry, standard strip stock could be used by a spiral welding apparatus to manufacture tapered structures. In addition to the components that comprise a classic cylinder forming machine, said apparatus must also contain a unit capable of removing triangular segments of material, and rejoining the edges, in addition to units capable of continuously changing the feed angle throughout the forming process.

These are just a few examples of the strip geometry that can be used to form a cone. Each has advantages and disadvantages which impact the design of the coiling machine. The stepped spiral has the advantage of using industry standard hot rolled coil stock, but the additional cross-welding step adds to machine cost and complexity and potentially slows the rate at which cones can be formed. If custom strip shapes are formed at the steel mill, then the involute or logarithmic spirals are likely preferable. Selecting between these depends on the difficulty of building a coiling machine with either active in-feed angle control, or variable width strip handling.

FIGS. 4*a*-4*c* and FIGS. 5*a*-5*c* give further examples of possible strip geometries from a linear tapered strip 42, to a constant curvature tapered strips 46, to triangular segments 47*a*-47*c*. Selection of a specific geometry should be guided by the properties of the available materials, and the details of the coiling machine, which vary depending on the cone scale and application.

Figure 5C:
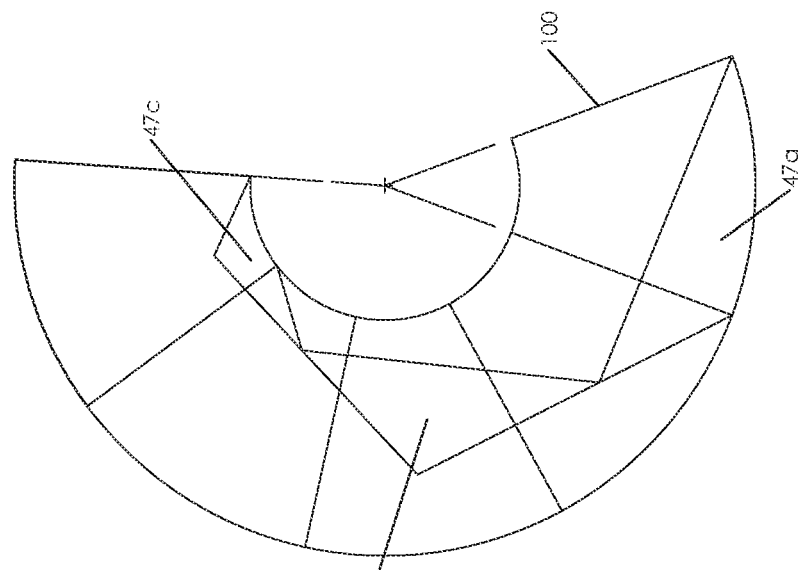
FIG. 5c shows how the strip to be wrapped to form a cone can also be segmented.
Figure 5B:
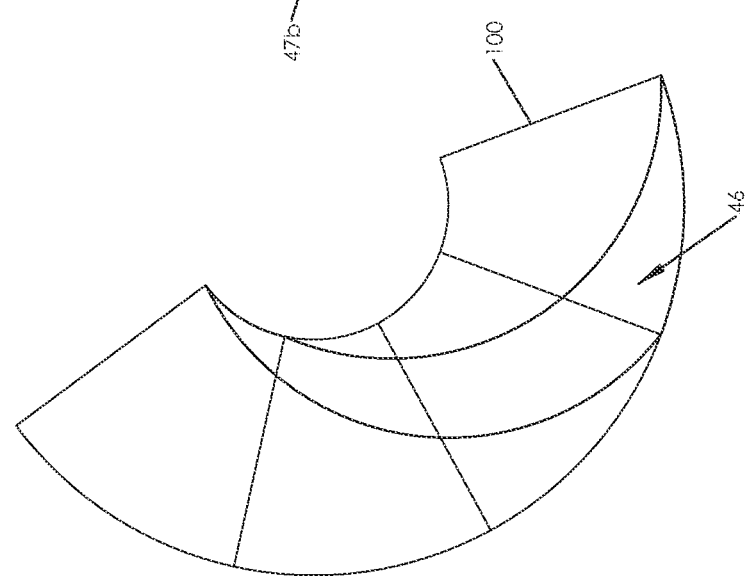
FIG. 5b shows the strip from FIG. 3d that can be wrapped to form a cone with 4 wraps
Figure 5A:
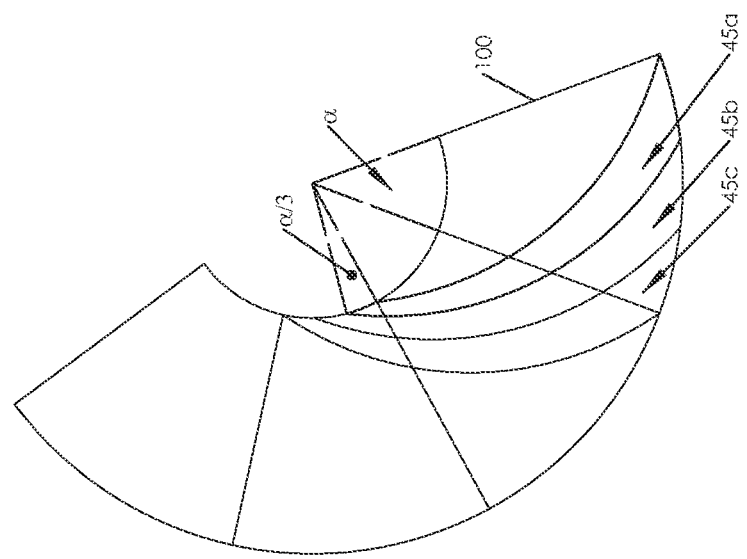
FIG. 5a shows how multiple strips can be formed so a multi-start wrap can be created.

In some applications, it may be desirable to simultaneously coil multiple strips together to form the cone. This could increase the rate of cone production by allowing multiple welders to run in parallel, and also allows for steeper helix angles for a given strip width. FIG. 5*a* shows how M multiple strips 45*a*, 45*b*, and 45*c* can be formed by using the previously describe construction technique, but rotating the construction curve 31 by $\alpha/M$ rather than $\alpha$. M such strips together then wrap to form the cone. In a machine to make conical structures, M narrower strips would thus be used instead of a single strip M times as wide.

Figure 8:
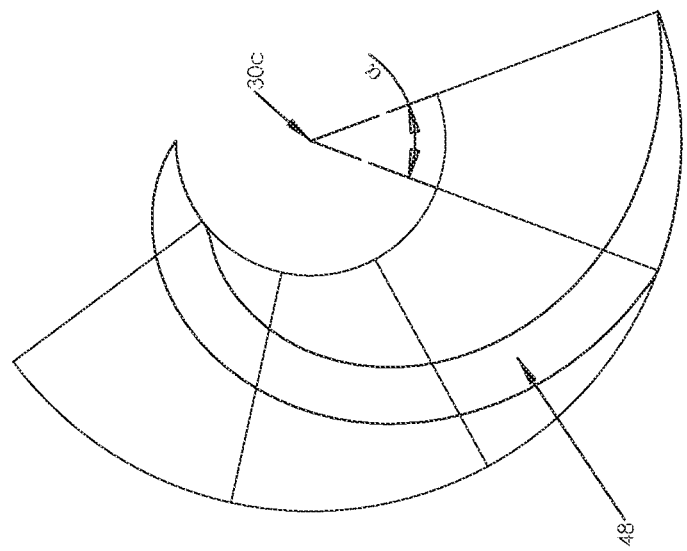
FIG. 8 shows an involute spiral shape strip that can be formed to wrap into a conical structure.

Some manufacturing techniques may have trouble forming a strip with step changes in the radius of curvature, so a continuous solution may be desirable. FIG. 8 shows how this shape 47 can be found by taking the previous annulus segment solution, and calculating the curve that results from making the included angle of the segments approach zero. The resulting curve is the involute to a circle centered on the origin 30*c* with radius equal to $S_w/\alpha$ where $\alpha$ is the included angle of the annulus segment 30 measured in radians. In polar coordinates, this curve is given by:

$$r(x) = \frac{S_w}{\alpha}\sqrt{1+x^2}$$
$$\theta(x) = \tan^{-1}(x) - x$$

from $$x = \sqrt{\left(\frac{\pi D_t}{S_w}\right)^2 - 1}$$

to $$x = \sqrt{\left(\frac{\pi D_b}{S_w}\right)^2 - 1}$$

Where $D_t$, $D_b$, $\alpha$, and $S_w$ are the previously defined geometric properties of the cone and strip. The edge of the strip is defined by the construction curve in polar coordinates r, and $\theta$ (measured in radians). The parameter x determines the distance along the involute spiral. The given bounds on x ensure that the cone starts and stops at the correct diameter. If either of the bounds on x become imaginary, then the given strip width is too large to form the desired cone without cutting or overlap.

Figure 10:
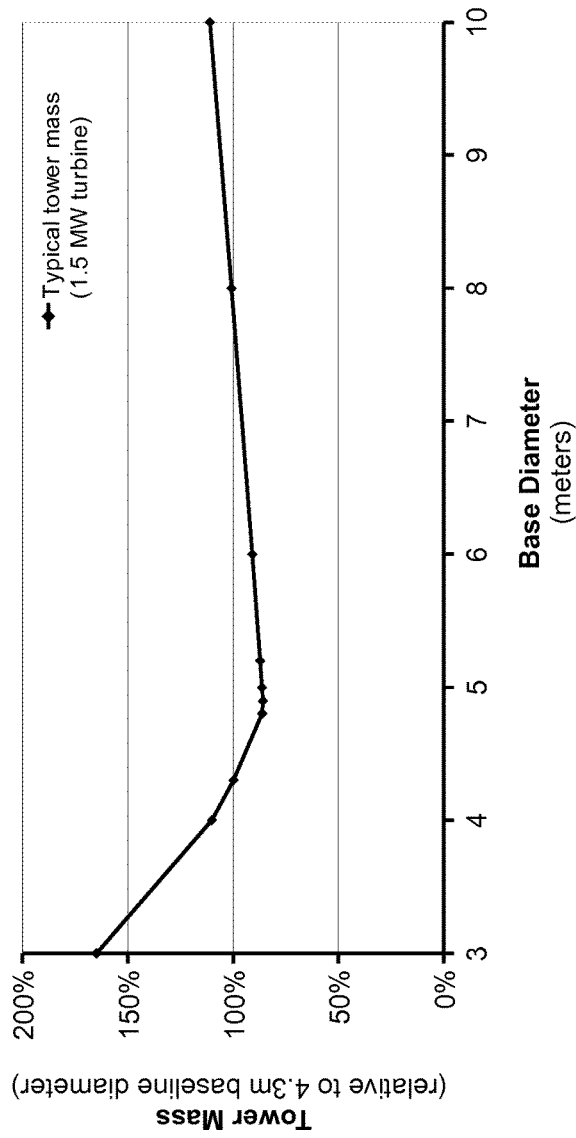
FIG. 10 shows a graph of the ratio of estimated tower mass versus base diameter (m) for a standard 80 m wind turbine tower designed to support a 1.5 MW turbine.
Figure 11:
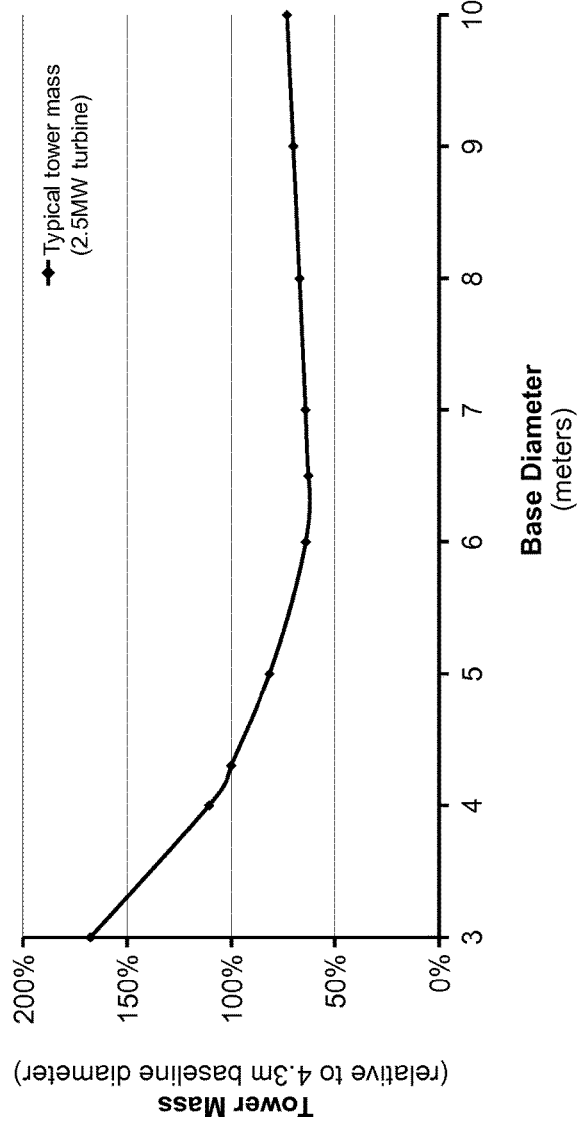
FIG. 11 shows a graph of the ratio of estimated tower mass versus base diameter (m) for a standard 100 m wind turbine tower designed to support a 2.5 MW turbine.

Using conical shells with large base diameters as wind turbine towers, as is made possible by the present invention, presents clear economic gains. The results yielded by a simple structural model are exposed as an illustration of this advantage as shown in FIGS. 10 and 11. For specified loads and tower heights from standard wind turbines, the minimum amount of steel is found so that the lowest limit, either material allowable stress or buckling stress, is not reached. The corresponding structure mass is readily obtained. FIGS. 10 and 11 illustrate how, according to this model, for two different cases, the mass of a wind turbine tower varies with its base diameter.

The reference (100%) is set for a base diameter of 4.3 m since it is the current maximum base diameter for standard towers due to shipping limitations. This curves show that the mass decreases significantly as the base diameter is increased until a certain point. In this region, the tower is designed with a wall thickness large enough for the local stress not to reach the steel maximum allowable stress limit. As the diameter increases, the loads are shared over a larger surface area and the stress decreases. Thus, the walls can be made thinner and the overall mass decreases. If the base diameter is larger than a certain value however, the design driving mechanism changes. The wall thickness reaches a lower limit such that the buckling stress is the lowest stress limit. Thus, the wall thickness cannot be decreased as much anymore and a larger base leads to an increased total mass unless buckling stiffeners are used.

This shows there is an optimal base diameter, unless buckling stiffeners are used, which depends on each specific case. However, for this type of utility scale multi-megawatt wind turbine application, this optimum is much larger than the current 4.3 m. FIG. 11 indicate that a decrease of about 40% in the quantity of steel needed, and hence cost, can be achieved for some common utility scale wind turbines by using large diameter towers. Moreover, this potential gain can be even larger for taller towers or larger wind turbines.

In addition, it could even be an enabling factor in making taller towers than would otherwise not be feasible. Taller towers could turn once marginal sites into high value wind sites and could allow other wind regimes to be reached.

This analysis shows that overcoming transportation limitations and enabling a way to use large base diameter towers is a fundamental need of the wind turbine industry. Current tower manufacture techniques require heavy equipment and fixturing which cannot be made easily transportable. Spiral welding manufacture is better suited for on-site tower manufacture. Current spiral welding machines are incapable of producing the tapered towers required by the wind industry because of the required in-plane curvature. The current invention provides this much needed solution.

Manufacturing a cone from the strips described above may be easier if the strip overlaps itself rather than being joined edge to edge. This also introduces buckling resistance if the helix angle is sufficiently steep as is the case in the multiple strip configurations. If overlap is desired, the strip width must be increased by the desired amount of overlap. Allowing the overlap to vary along the length of the cone may simplify the required strip geometry.

Further modifications of the invention will also occur to persons skilled in the art, and all such are deemed to fall within the spirit and scope of the invention as defined by the appended claims.

What is claimed is:

1. A stock material comprising:
a strip of planar material, the strip of planar material having a plurality of first straight edges and a plurality of second straight edges, each first straight edge defining a respective section of a first stepped spiral, and each second straight edge defining a respective section of a second stepped spiral, wherein each first straight edge of the first stepped spiral is parallel to a respective second straight edge of the second stepped spiral, wherein the plurality of first straight edges and the plurality of second straight edges are collectively dimensioned such that the strip of planar material is formable into a tapered structure in which the first stepped spiral adjoins the second stepped spiral.

2. The stock material of claim 1, wherein at least two of the first straight edges have different lengths.

3. The stock material of claim 1, wherein the strip of planar material is a weldable material.

4. A stock material comprising:
a plurality of planar sections, each planar section having a first edge and a second edge different from the first edge, wherein the plurality of planar sections is dimensioned such that, in a first planar configuration, the first edges of the plurality of planar sections are spaced apart from and aligned with one another, each second edge of each planar section is in a point contact with the respective second edge of another planar section, and each pair of planar sections in point contact with one another defines a respective triangular space therebetween.

5. The stock material of claim 4, wherein each triangular space has the same dimensions as each of the other triangular spaces.

6. The stock material of claim 5, wherein each triangular space is an isosceles triangle.

7. The stock material of claim 4, wherein each point contact between adjacent planar sections defines a first vertex of the respective triangular space between the adjacent planar sections.

8. The stock material of claim 4, wherein a second vertex and a third vertex of each respective triangular space are aligned with the first edges of the plurality of planar sections.

9. The stock material of claim 8, wherein the plurality of planar sections are movable, relative to one another, from the first planar configuration to a second planar configuration in which each triangular space is collapsed and the plurality of planar sections collectively form a stepped spiral.

10. The stock material of claim 4, wherein each planar section of each pair of adjacent planar sections is adjoined to one another at the point contact therebetween.

11. The stock material of claim 4, wherein at least one planar section of the plurality of planar sections is an isosceles trapezoid.

12. The stock material of claim 4, wherein the first edges of the plurality of planar sections are linear.

13. The stock material of claim 4, wherein at least one of the second edges is linear.

14. The stock material of claim 4, wherein at least one of the first edges is parallel to at least one of the second edges.

15. The stock material of claim 4, wherein the planar sections of the plurality of planar sections are formed of a weldable material.

16. The stock material of claim 4, wherein the first edges of at least two of the plurality of planar sections have different lengths.

17. The stock material of claim 4, wherein a respective maximum width is the same for each planar section in a direction perpendicular to the first edges of the planar sections.

* * * * *